Patented May 29, 1951

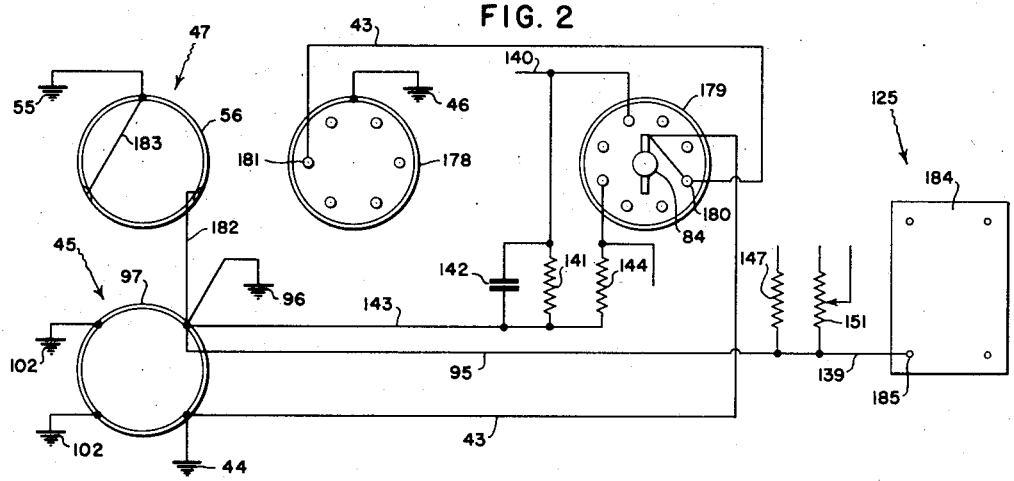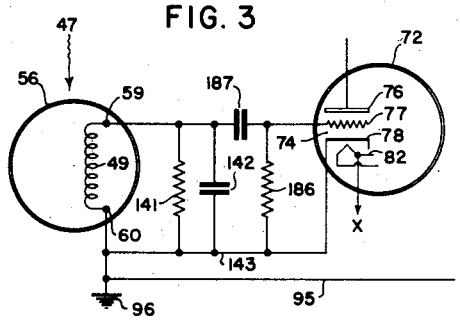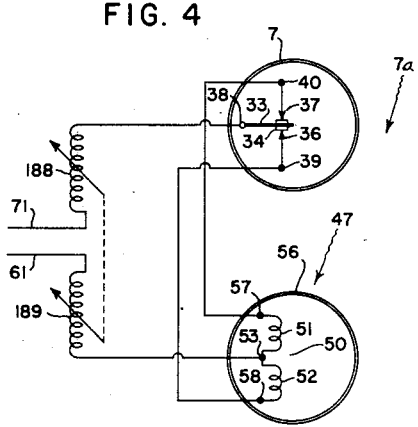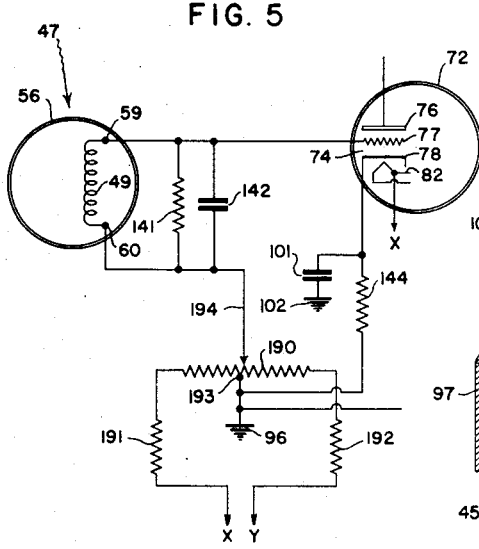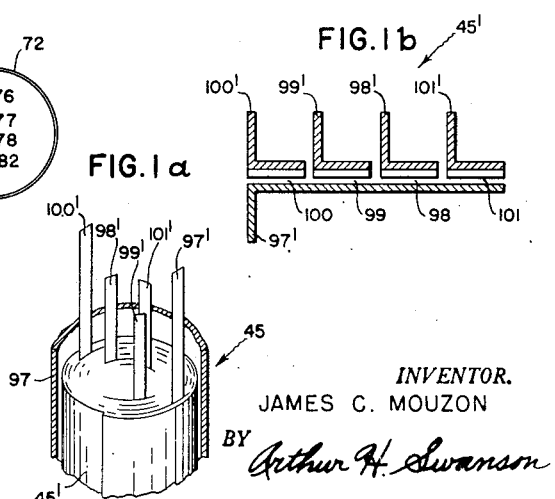
INVENTOR.
JAMES C. MOUZON
BY Arthur H. Swanson
ATTORNEY.

2,554,717

UNITED STATES PATENT OFFICE 2,554,717

MEASURING AND CONTROLLING APPARATUS

James C. Mouzon, Philadelphia, Pa., assignor, by mesne assignments, to Minneapolis-Honeywell Regulator Company, Minneapolis, Minn., a corporation of Delaware Application January 26, 1946, Serial No. 643,780

3 Claims. (Cl. 318—28)

The present invention relates to improvements in apparatus having especial utility in measuring and/or controlling the magnitude and changes in magnitude of electrical, thermal, chemical, physical and mechanical quantities or qualities.

An object of the invention is to provide improvements in electrical measuring and/or controlling apparatus to the end that there may be obtained increased sensitivity of response and freedom from extraneous and deleterious effects tending to interfere with the desired operation of the apparatus.

In sensitive electrical measuring and/or controlling arrangements which have been proposed in the prior art, it is customary to employ electronic amplifiers to amplify for measurement and control purposes a small electrical signal derived from and varying in accordance with the change in a variable condition under measurement. Due to the presence of extraneous electrical and magnetic fields, the sensitivity of response of the electronic amplifiers of the prior art arrangements is limited to a value determined by the level of the interfering stray voltages picked up in various portions of the amplifiers. Such stray voltages may be introduced at any portion of the amplifier circuit, as for example, the input circuit thereof, or in an advanced stage, or may be introduced into circuits associated with the amplifier but external thereto, for instance the measuring circuit in which are produced the electrical signals or voltages it is desired to amplify. If the sensitivity of the amplifier is increased to such an extent that the amplifier is responsive to normal signals which are of the same order of magnitude as the stray voltages picked up, the amplifier is unable to distinguish between the desired and undesired signals and will amplify both, causing the operation of the associated apparatus to be erratic and unstable, and in some cases, unsuitable for control purposes.

According to the present invention, simple and efficient means are provided to maintain the level of the stray signals in the measuring circuit and in the amplifier at an extremely low value, thus permitting increased sensitivity of response of the apparatus without objectionable interference from stray signals.

Another object of the invention is to provide measuring and controlling apparatus incorporating improved safety provisions to modify the control upon failure of the condition responsive means or other components of the apparatus as required either to actuate an alarm indicative of such failure or to provide "safe" operation.

This feature of my invention is of particular utility when embodied in potentiometric temperature measuring and controlling apparatus in which a thermocouple is employed as the primary condition responsive element. Because of their exposure to high temperatures, deleterious atmospheres, and vibrations within a furnace, thermocouples sometimes burn out or otherwise become open circuited. When the apparatus is arranged to vary the supply of fuel to the furnace as required to maintain the temperature thereof approximately constant, such open circuiting of the thermocouples tends to operate through the apparatus to effect an increase in the supply of fuel irrespective of the value of the furnace temperature, giving rise to a dangerous and otherwise undesirable condition of operation.

In order to avoid such an occurrence, it has been proposed in the prior art to provide means for introducing a normally ineffective signal or voltage of controlled magnitude and phase into the electronic amplifier, which signal becomes operative upon thermocouple or potentiometric network open circuiting or failure of other components of the apparatus to cause operation of the apparatus in a "safe" sense, that is, in the direction resulting in a decrease in the supply of fuel to the furnace. The effectiveness of an arrangement of this type is seriously limited, however, by stray signals which may be introduced into the amplifier. For example, if the stray signals should happen to be opposite in phase to the introduced controlled signal, the latter may be cancelled with the result that the apparatus will not fail "safe" as intended upon thermocouple or other failure. Moreover, upon open circuiting of the thermocouple, or other potentiometric circuit or apparatus component, the level of the stray signals introduced tends to increase appreciably due to the more efficient pick-up circuit then provided, further aggravating the situation.

According to the present invention means are provided for limiting to a suitably low level the amplitude of the stray signals introduced into the amplifier upon open circuiting of the thermocouple or other potentiometric circuit or apparatus component, thus providing positive assurance of the desired operation of the apparatus upon such occurrence.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Figs. 1a and 1b show in detail a component of the device illustrated in Fig. 1;

Fig. 2 is a more or less diagrammatic illustration of the amplifier grounding arrangement employed in the arrangement of Fig. 1, and Figs. 3, 4 and 5 show modifications of the input circuit of the electronic amplifier provided in the arrangement of Fig. 1.

Figure 1:
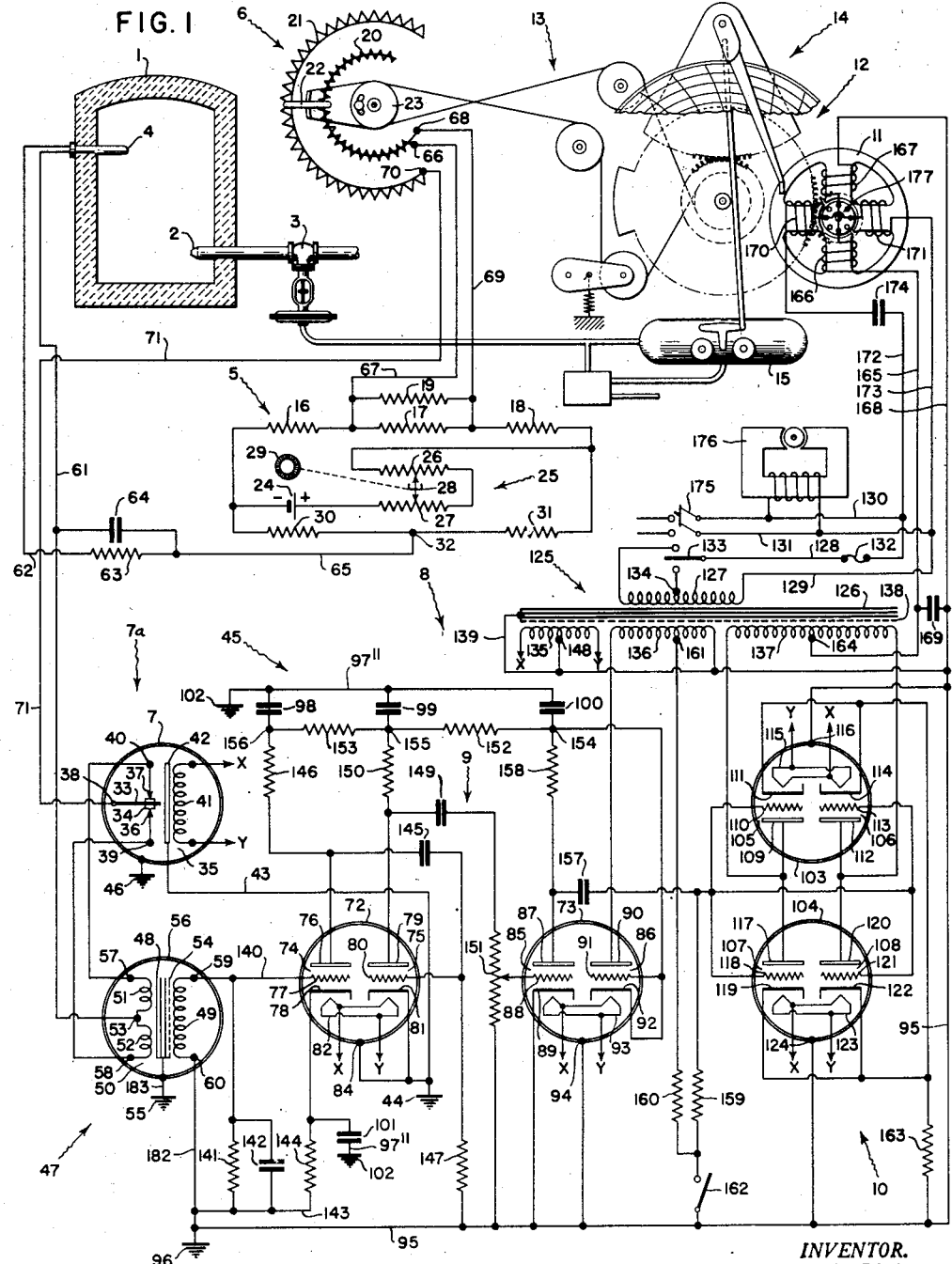
Fig. 1 is a schematic illustration of a practical embodiment of the present invention.

Referring to Fig. 1, there is schematically illustrated a measuring and controlling apparatus in the form of a self-balancing potentiometer controller for measuring, indicating, recording, and controlling the value of a condition, for example, the temperature within a furnace 1. The furnace is heated by a burner 2 the supply of fuel to which is controlled by a pneumatic valve 3.

A thermocouple 4 responsive to the temperature in the furnace 1 is connected to act in conjunction with a potentiometric network generally designated at 5 and a slide-wire resistance assembly generally designated at 6. As the temperature within the furnace changes, the potentiometer network is correspondingly unbalanced to create a direct current flow in a branch thereof, the amplitude and polarity of said direct current depending respectively upon the extent and direction of the change in the furnace temperature.

This direct current flow produced in the potentiometer network is fed through a converter 7a by means of which it is translated into an alternating voltage of commercial frequency, for example 25 or 60 cycles per second, and of one phase or of opposite phase depending upon the polarity of the direct current flow. The alternating voltage so derived is passed into an electronic amplifier generally designated at 8, wherein it is amplified by means of a voltage amplifier generally designated at 9. The amplified voltage is then fed into a motor drive circuit generally designated at 10, which controls the operation of a reversible drive motor 11. This motor 11 is connected by mechanisms 12 and 13 to the slide-wire assembly 6 in such a manner that operation of the motor in response to the amplified quantity derived from the potentiometric unbalance effects an adjustment of the slide-wire 6 in the proper direction and in the required amount to cause the potentiometer circuit to be rebalanced. The motor 11 also positions indicating and recording means 14 for indicating and recording the temperature existing in the furnace 1. Recording means 14 is of well-known type, and is not shown completely here to avoid undue complication of the drawing.

A controller generally designated at 15 is also operated by the motor 11 through suitable means. The controller 15 may take the form of a pneumatic controller such as is illustrated in the C. B. Moore Patent 2,125,081, granted July 26, 1938. This controller 15 operates to control the valve 3 as required to maintain the temperature within the furnace 1 at a desired value.

The potentiometric network 5 comprises three resistances 16, 17 and 18 connected in series in one potentiometric branch and provided for calibration purposes. Connected in parallel with the resistance 17 is the slide-wire assembly 6, and a calibrating resistance 19, used to adapt the slide-wire 6 to different range values. The slide-wire assembly 6 consists of the resistance element 20 and a collector bar 21, this bar being in continuous contact with a slider 22, the latter also contacting the element 20. A member 23 carries the slider 22 and causes the latter to be moved over the resistance element 20 and the collector bar 21 in response to movements of the motor 11 through the mechanisms 12 and 13.

Also in parallel with the potentiometric branch containing resistances 16, 17 and 18 is another branch containing a battery 24 and a vernier resistance 25 connected in series. The vernier resistance 25 consists of variable resistances 26 27 in series, these being contacted by a slider 28. There is a lost-motion connection between the control knob 29 and the slider 28, operating so that rotation of knob 29 moves at first only the lower portion of slider 28 which is in engagement with resistance 27. Further rotation of the knob 29 causes the upper portion of slider 28 to move over the resistance 26. A coarse and a fine adjustment of the resistance in series with battery 24 is thereby provided.

Connected in parallel with the aforementioned potentiometric branches is another branch comprising a compensating resistance 30 and a standardizing resistance 31 connected in series, and joined at the point 32. The resistance 30 serves to compensate for temperature changes at the cold junction of the thermocouple, and is preferably made of copper or other material having a positive temperature coefficient of resistance. The resistance 31 is provided for standardization purposes. In order to avoid undue complication of the drawing, no standardizing provisions have been illustrated, but it will be understood that manual or automatic standardizing means of known construction may be employed, if desired. With the exception of resistance 30, the resistance of the potentiometer circuit are preferably formed of manganin wire having substantially no temperature coefficient of resistance.

The converter 7a includes a vibrator 7 which may be of the type disclosed and claimed in the copending application of Frederick W. Side, Serial No. 421,176, filed December 1, 1941, which issued as Patent No. 2,423,524 on July 8, 1947. As shown in Fig. 1, vibrator 7 includes a reed 33 carrying a pair of contacts 34. The reed 33 is under the influence of a varying magnetic field produced by an electromagnetic assembly 35 and is caused to vibrate between the contacts 36 and 37, alternately making contact therewith. Reed 33 is connected to terminal 38, contact 36 is connected to terminal 39, and contact 37 is connected to terminal 40. The electromagnetic assembly 35 consists of a coil 41 and a permanent magnet 42, so arranged that when an alternating current is caused to flow through the coil 41, an alternating magnetic field is set up which causes the reed 33 to vibrate between contacts 36 and 37 at a frequency of vibration equal to the frequency of the alternating current in coil 41. Preferably, this alternating current is of commercial frequency, namely 25 or 60 cycles per second. The mounting structure of the coil, magnet, reed, and contacts is grounded through lead 43 and a chassis connection 44 at the container of a multiple section electrolytic condenser 45 to be hereinafter described. The metal can containing the vibrator is grounded through a chassis connection 46.

The converter 7a also includes an input transformer 47 comprising a core 48 on which are wound a secondary winding 49 and a center-tapped primary winding 50, having equal winding sections 51 and 52, which are joined at the terminal 53. A shield 54 is placed between the primary and secondary windings, and is grounded through a chassis connection 55. The core 48 and mounting can 56 of the transformer 47 are also grounded through chassis connection 55. The ends of primary winding 50 are connected to terminals 57 and 58, respectively, and the ends of secondary winding 49 are connected to terminals 59 and 60, respectively.

The thermocouple 4 is connected in a series circuit including the vibrator 7, transformer 47, potentiometric network 5, and slide-wire assembly 6. Specifically, one terminal of the thermocouple 4 is connected by a conductor 61 to the terminal 53 of the transformer 47. The other terminal of the thermocouple is connected by a conductor 62 to one end of a resistance 63, the latter acting in conjunction with a condenser 64 to provide damping, or anti-hunting operation of the motor and elimination of undesired effects due to stray electrical fields. The opposite end of resistance 63 is connected through a conductor 65 to the point 32 on the potentiometric network 5. The condenser 64 is connected between conductors 61 and 65.

As shown, one end of the slide-wire resistance 20 is connected to terminal 66, to which is also connected conductor 67. The latter is connected to the common junction of resistances 16 and 17. The other end of resistance 20 is connected to terminal 68, to which is also connected conductor 69. The latter is connected to the common junction of resistances 17 and 18. The resistance 19 is connected between conductors 67 and 69. The collector bar 21 is connected through terminal 70 and conductor 71 to terminal 38 of reed 33 of vibrator 7.

The battery 24 operates to produce a difference of potential between the terminal 70 of the slide-wire assembly 6 and the point 32 of the potentiometric network 5. The magnitude of this potential difference is determined by the position of slider 22 along slide wire resistance 20. This potential difference is opposed to the E. M. F. produced by the thermocouple 4. As the slider 22 is moved in a clockwise direction over the resistance 20, the potentiometric potential difference between points 32 and 70 is increased. Similarly, as slider 22 is moved in a counter-clockwise direction, the potentiometric potential difference between points 32 and 70 is decreased. When the potentiometer is balanced, the potentiometric potential difference between points 32 and 70 is equal and opposite to the thermocouple E. M. F. between these points, and therefore, no current flows in the thermocouple circuit or through the primary 50 of transformer 47.

For purposes of illustration, and not by way of limitation, it may be stated that the resistance between the points 38 and 53 of the vibrator 4 and the input transformer 47, respectively, is of the order of 200 ohms in a practical working embodiment of the invention.

The voltage amplifier 9 of electronic amplifier 8 comprises three stages of voltage amplification, and includes two vacuum tubes 72 and 73, the vibrator 7, the transformer 47 and the multiple electrolytic condenser 45. The vacuum tubes 72 and 73 are of the twin-triode type, such as the type 7F7, having two sets of triode elements in a single envelope. The tube 72 contains the two sets of triode elements 74 and 75. The triode 74 consists of a plate 76, a grid 77, and a cathode 78 and is in the first stage of amplification. The triode 75 consists of a plate 79, a grid 80, and a cathode 81 and is in the second stage of amplification. A common heater 82 heats the cathodes 78 and 81. The usual shielding in the tube 72, not shown, is connected to a central projection on the base of the tube, also not shown, and this projection normally is in contact with a central contact 84 on a tube socket, not shown. The contact 84 is grounded through conductor 43 and the chassis connection 44. An external tube shield, not shown, is placed over the tube 72, this shield being grounded by making contact with the base of the tube, which base is internally connected to the central projection, which in turn is grounded as explained above.

The vacuum tube 73 contains two sets of triode elements 85 and 86. The triode 85 consists of a plate 87, a grid 88, and a cathode 89 and is in the third stage of amplification. The triode 86 consists of a plate 90, a grid 91, and a cathode 92, and with the grid and cathode tied together serves as a diode half-wave rectifier. A common heater 93 heats the cathodes 89 and 92. The internal shielding of the tube, not shown, is connected to a central projection on the base of the tube, also not shown, and this projection is normally in contact with a central contact 94 on a tube socket, not shown. The contact 94 is grounded through a ground bus 95 and a chassis connection 96.

The multiple section electrolytic condenser 45 hereinbefore mentioned comprises a condenser cartridge 45' contained in a metal can 97 as shown in Fig. 1a. The cartridge 45' consists of a continuous condenser cathode foil and a sectional condenser anode foil separated by an electrolytic separator and wound into a cylindrical form as shown in Fig. 1a. In Fig. 1b, the separate portions of anode foil are shown forming with the cathode foil and electrolytic separator a plurality of filter condenser sections 98, 99, and 100, and a cathode by-pass condenser section 101. Connection is made to the anodes of the various condenser sections 98, 99, 100, and 101 by conductors 98', 99', 100', and 101', respectively. These conductors are in the form of metallic tabs, being portions of the respective anode foils as shown in Fig. 1b. In Fig. 1a, these tabs are shown projecting from the end of the condenser cartridge 45'. Connection is made to the common cathode of the condenser 45 by means of a similar tab 97', which projects from the end of the cartridge 45' and is connected to the can 97, this connection not being shown in Fig. 1a.

Although the condensers 98, 99, 100, and 101 have a common cathode, as shown in Fig. 1b, these condensers are shown in Fig. 1 in the conventional manner as being separate, in order to avoid confusion of the drawing. In Fig. 1, therefore, a conductor 97" is shown, connecting the cathodes of the condensers 98, 99, 100, and 101 to ground at a point 102. This point 102 represents the connection between the four mounting lugs, not shown, which serve to secure the condenser can 97 to the chassis, serving also to ground the cathodes of the condensers 98, 99, 100, and 101 through the cathode foil tab 97', the can 97, the mounting lugs, and the chassis. Two of these lugs also serve as the chassis connections 44 and 96 for other portions of the circuit as described above. This grounding arrangement is more clearly shown in Fig. 2.

In practice it is expedient to have the condensers 98, 99, 100, and 101 in the same container because of space saving and cost considerations. It has been discovered, however, that deleterious stray signals may be introduced into the first stage of the voltage amplifier 9 if the cathode bias condenser 101 is located improperly within the container 97 with respect to the filter condensers 98, 99, and 100. The optimum location of condenser 101 has been found to be a position as far removed as possible from the filter condenser 100, as shown in Fig. 1b, since the latter condenser has across it a ripple voltage described more fully hereinafter, which voltage can leak to condenser 101 and cause a stray signal to appear in the first voltage amplifying stage. With condenser 101 in the above optimum location, the tendency for the introduction into the voltage amplifier 9 of stray signals from this source is substantially reduced, due not only to the increase in the resistance of the leakage path between the condensers 100 and 101 caused by the maximum separation, but also to the shielding between these condensers afforded by the intervening anode foils of the condensers 98 and 99. It is noted that in the aforementioned practical embodiment of the invention the value of the condenser 101 is 20 microfarads.

In certain cases manufacturing considerations may make it desirable to interchange the positions of the condensers 98 and 101 in Fig. 1b. The resulting placement of the condenser 101 closer to the condenser 100 causes an increase in the magnitude of the stray signal picked up by the condenser 101 from the condenser 100, but in some cases this increase in the stray signal can be tolerated, particularly since the anode foil of the condenser 99 still serves to shield the condenser 101 from the condenser 100.

The motor drive circuit 10 of electronic amplifier 8 comprises two vacuum tubes 103 and 104, these being of the twin triode type, such as the type 7N7, and used for power amplification purposes. The tube 103 comprises two triode sections 105 and 106, and the tube 104 comprises two triode sections 107 and 108. The triode 105 consists of a plate 109, a grid 110, and a cathode 111. The triode 106 consists of a plate 112, a grid 113, and a cathode 114. A common heater 115 heats the cathodes 111 and 114. The internal shielding (not shown) for the tube 103, is connected to a socket contact 116 in the same manner as for the tubes 72 and 73 described above. The contact 116 is grounded through ground bus 95. The triode section 107 of tube 104 consists of a plate 117, a grid 118, and a cathode 119. The triode 108 consists of a plate 120, a grid 121, and a cathode 122. A common heater 123 heats the cathodes 119 and 122. The internal shield, not shown, for the tube 104 is connected to a socket contact 124 in the same manner as for the tubes 72 and 73 described above. The contact 124 is grounded through ground bus 95.

A power transformer generally designated at 125 is used to supply the necessary power to the voltage amplifier 9 and motor drive circuit 10 of electronic amplifier 8. The transformer 125 comprises a core 126 on which is wound a primary winding 127 which is supplied with an alternating current from an A. C. supply, not shown, through conductors 128 and 129, the latter being connected to the supply lines 130 and 131 respectively. A fuse 132 is inserted in the conductor 128 for protecting the transformer from excessive currents. A switch 133 is connected between the conductor 128 and primary winding 127 and provides for the operation of the transformer from two different supply voltages, for example 110 volt and 125 volt supply sources, utilizing the tap 134 on the winding 127 for this purpose. Also wound on the core 126 are three secondary windings 135, 136, and 137, the purpose of which is explained below. A shield 138, connected to the core 126, is placed between the primary and secondary windings, and this shield and the core are grounded through conductor 139 and ground bus 95.

The internal connections of the voltage amplifier 9 are as follows: the terminal 59 of the secondary winding 49 of transformer 47 is connected to grid 77 of the triode 74 by a conductor 140. A resistance 141 and a condenser 142 are connected in parallel between the grid 77 and a ground bus 143, the latter being grounded at the chassis connection 96, to which chassis connection the ground bus 95 and the terminal 60 of the transformer secondary winding 49 are also connected. The condenser 142 is used to stabilize the amplifier, preventing oscillation. The resistance 141 limits the open-circuit impedance of the secondary winding 49 and minimizes the effects of open-circuit stray signals or voltages, as hereinafter described. It is noted that in the aforementioned practical embodiment of the invention the value of the resistance 141 is one tenth megohm, and the value of the condenser 142 is 0.015 microfarad.

The cathode 78 of the triode 74 is connected to ground bus 143 through a cathode bias resistance 144. The cathode condenser section 101 of condenser 45 has its anode or positive terminal connected to cathode 78, the cathode of condenser 101 being grounded through the can 97 as explained above. It is noted that in the aforementioned practical embodiment of the invention the value of the resistance 144 is ten thousand ohms.

The plate 76 of the triode 74 is coupled to the grid 80 of triode 75 by a coupling condenser 145. This condenser blocks the D. C. component of the plate circuit voltage on plate 76 from grid 80, but impresses on the latter the A. C. component of the voltage produced across a load resistance 146 connected in the plate circuit of triode 74. A resistance 147 is connected between the grid 80 and ground bus 95. This resistance serves as a part of the load for the preceding tube and has developed across it the A. C. voltage to be further amplified. Due to the D. C. IR drop across the resistance 147, the latter assists in providing grid bias for the triode 75. The cathode 81 is connected to ground bus 43. The secondary winding 135 of the transformer 125 supplies energizing voltage to the heater 82 of tube 72 through conductors X and Y, partially shown. Winding 135 also supplies energizing voltage to the other heaters 93, 115 and 123 of the tubes 73, 103 and 104 respectively, as well as to the coil 41 of the vibrator 7. A center tap 148 of winding 135 is grounded through ground bus 95, for the purpose of balancing out to a large extent the A. C. picked up by the cathodes from the energizing voltage of their respective heaters. The plate 79 of the triode 75 is coupled to the grid 88 of the triode 85 by a coupling condenser 149. This condenser blocks the D. C. component of the plate circuit voltage on plate 79 from grid 88, but impresses on the latter the A. C. component of the voltage produced across a plate resistance 150, located in the plate circuit of triode 75. A variable grid resistance 151 is connected between the grid 88 and ground bus 95, this resistance serving the same purpose for triode 85 as resistance 147 accomplishes for triode 75. Resistance 151 is provided with an adjustable slider for varying the amount of signal impressed on the grid 88 from the plate 79, and thus, comprises a sensitivity adjustment. The cathode 89 of triode 85 is connected to ground bus 95.

The three stages of amplification receive plate voltage from a unidirectional voltage supply circuit which comprises the triode 86, the filter condensers 98, 99, 100, two filter resistances 152 and 153, and the winding 136 of the transformer 125. The winding 136 supplies an alternating voltage between the ground bus 95 and the plate 90 of triode 86. The grid 91 and the cathode 92 of the latter are tied together, giving diode operation, and these are connected to the anode or positive terminal of the first filter condenser 100 at the point 154. The condenser 100 is charged by current flow through the diode on alternate half cycles, and produces from this pulsating supply a relatively constant D. C. voltage. The A. C. ripple component of the D. C. voltage leaving this first stage of filtering is relatively small.

The rectified current passes into a second and a third stage of filtering consisting of the condenser 99 and the resistance 152 and the condenser 98 and the resistance 153 respectively. In each of the three stages of filtering, the ripple component of the rectified direct current is smoothed out, with the result that there is less ripple at point 155 than at point 154 and still less at point 156. This is necessary since the first stage of amplification can tolerate less ripple in its plate supply voltage than can the second or third stages, due to the high gain in the first stage and because of the amplification following the first stage. Similarly, less ripple is allowed in the plate supply to the second stage than can be tolerated in the voltage supplied to the third stage.

It is the ripple component of the plate supply voltage appearing across the condenser 100 in the first stage of filtering which tends to leak to the cathode by-pass condenser 101 and consequently tends to cause a stray voltage component to be introduced as a stray signal into the grid-cathode circuit of triode 74. This occurs when the condenser 101 is not in its optimum position. As explained hereinbefore, such occurrence is avoided by locating the cathode by-pass condenser 101 as far away from the filter condenser section 100 as possible inasmuch as the ripple voltage which appears across the latter is of the greatest magnitude in the filter, and hence, is the most troublesome source of stray signals.

The plate 87 is coupled to the grids 110, 113, 118 and 121 of the motor drive tubes 103 and 104 by a coupling condenser 157. The condenser 157 prevents the D. C. component of the voltage on plate 87 from reaching grids 110, 113, 118 and 121, but allows the A. C. component of the voltage across a plate load resistance 158 included in the plate circuit of triode 85 to be impressed on said grids. Two resistances 159 and 160 are connected in series between the grids 110, 113, 118 and 121 and a tap 161 on the winding 136. A switch 162 is connected between the common junction of the resistances 159 and 160 and the ground bus 95.

This arrangement serves to provide an indication and "safe" operation of the apparatus in the event the thermocouple burns out or the thermocouple or potentiometric circuit becomes open circuited in any other manner or in the event of failure of the converter 7a or voltage amplifier 9. The grid resistances 159 and 160 function in the same manner for their associated tubes as do the grid resistance 147 and 151 for their tubes. When the switch 162 is in the open position, as shown in Fig. 1, the grid return to ground for the grids of the motor drive tubes is through the resistances 159 and 160 and a small portion of the secondary winding 136 located between the tap 161 and the grounded end of the winding. This permits the introduced A. C. voltage from the portion of winding 136 to be superimposed upon the A. C. signal voltage developed across the resistances 159 and 160 from the plate circuit of triode 85. When the switch 162 is closed, the aforementioned grids of the motor drive tubes are grounded through the resistance 159 and the ground bus 95, the resistance 159 serving as a conventional grid resistance, and no A. C. is supplied to the grids from the portion of winding 136.

The cathodes 111, 114, 119 and 122 of the motor drive tubes 103 and 104 are connected together, and a resistance 163 is connected between these cathodes and the ground bus 95. The resistance 163 provides the major portion of the grid bias for the motor drive tubes 103 and 104.

One end of the secondary winding 137 is connected to the plates 109 and 117 of triodes 105 and 107 respectively. The other end of winding 137 is connected to the plates 112 and 120 of triodes 106 and 108, respectively. A center tap 164 on the winding 137 is connected by a conductor 165 to one end of a pair of series connected control windings 166 and 167 of the motor 11. The other end of the pair of control windings 166 and 167 is connected to ground bus 95 by a conductor 168. Thus, it can be seen that the voltage of winding 137 is applied to the motor control windings 166 and 167 through the tubes 103 and 104 and the resistance 163. A condenser 169 is connected between the conductors 165 and 168 and together with the control winding 166 and 167 forms a parallel resonant circuit. This circuit has, therefore, a relatively high external impedance for matching the plate impedance of the tubes 103 and 104, and also has a relatively low internal impedance for obtaining desirable motor operation.

The motor 11 has two series connected power windings 170 and 171 which are supplied with alternating current by conductors 172 and 173 which are connected to the supply lines 130 and 131 respectively. In series with the power windings and the A. C. source is a condenser 174 which has its value so chosen that together with the power windings it forms a series resonant circuit when the motor 11 is operating at full speed. Thus, as the speed of motor 11 increases towards full speed, more current is allowed to flow through the power windings, providing the needed additional torque. This current is in phase with the line voltage due to the action of condenser 174.

A switch 175 is connected between the A. C. source and the supply lines 130 and 131. A chart-driving motor 176 is connected across lines 130 and 131.

When the potentiometer circuit is balanced, no current flows through the primary winding 50 of transformer 47. Consequently, no signal is then amplified by the amplifier 9. Under this condition, the triodes 105 and 107 and triodes 106 and 108 of the motor drive circuit conduct alternately to equal extents, resulting in a flow of current to the control windings 166 and 167 of motor 11 which locks the motor rotor 177, preventing a change in position of slider 22 on resistance 20. The manner in which this result is accomplished is fully described in a copending application of Walter P. Wills, Serial No. 421,173 filed December 1, 1941, which issued as Patent No. 2,423,540 on July 8, 1947, wherein the structure producing it is also claimed.

With an increase in temperature in the furnace 1 from a temperature at which the potentiometer is in balance, the potentiometer becomes unbalanced, and a current flows in a corresponding direction in the thermocouple and converter circuit. The magnitude of this current is proportional to the amount of the increase in furnace temperature and is interrupted by the vibrator 7, and in consequence, pulsating currents flow through winding 50 of transformer 47 to cause the induction of an alternating voltage across the secondary winding 49. This induced alternating voltage is of the frequency of the voltage supplied to the vibrator coil 41, and its magnitude is proportional to the amount of unbalance in the potentiometer circuit, and hence, is proportional to the amount of temperature increase which has occurred. For the case under consideration, the voltage produced across the winding 49 may be assumed to be in phase with the A. C. supply voltage.

The voltage across winding 49 is amplified by the voltage amplifier 9, and the amplified quantity controls the motor drive stage 10 so as to cause the latter to deliver to the control windings 166 and 167 of motor 11, a voltage which is in such phase relationship with respect to the voltage across the power windings 170 and 171 as to cause the required rotation of the rotor 177 needed to move the slider 22 on the resistance 20 in the proper direction to rebalance the potentiometer circuit. When the potentiometer reaches the new balance point, no current flows in the converter circuit 7a, the motor rotation ceases, and further rotation is prevented as explained above.

Upon a decrease in temperature in the furnace, the converse of the above operation occurs, that is, a voltage appears at the input to the converter 7a which produces across the transformer secondary winding 49 an alternating voltage proportional in magnitude to the amount of temperature decrease, but 180° out of phase with the A. C. supply voltage. As outlined above, this voltage is amplified and causes a voltage to be applied across the motor control windings. Now, however, this voltage has such a phase relationship with respect to the power winding voltage that the rotor 177 is caused to rotate in a direction opposite to that caused by a temperature increase. Such rotation then causes movement of the slider 22 in the opposite direction to effect rebalance of the potentiometer circuit.

As was stated hereinbefore, a portion of the winding 136 of the transformer 125 is part of a circuit for providing protection in the event of thermocouple or other potentiometric circuit component open circuiting, or other apparatus failure. In this circuit, an alternating current is applied between the grids and the respective cathodes of the motor drive tubes 103 and 104 when the switch 162 is in the open position as shown in Fig. 1. This current is in such a phase relationship with respect to the supply voltage that it tends to cause motor operation in a direction corresponding to that caused by an increase in furnace temperature. The potentiometer slider 22 comes to rest at a point such that the unbalance current in the potentiometer circuit produces an amplified voltage at the motor drive stage which opposes and neutralizes the applied protective voltage. Therefore, in the "balanced" condition a current of sufficient magnitude to cause the voltage introduced by winding 136 to be cancelled flows in the thermocouple and converter circuit.

If the thermocouple, potentiometric, or amplifier circuit opens at some point, as upon the occurrence of thermocouple burn-out, the normal potentiometer circuit unbalance current is no longer effective to neutralize the voltage applied to the motor drive tube grids by the transformer secondary winding 136. As a result the latter voltage causes motor operation, as explained. Since the motor also drives the fuel regulator 15, the supply of fuel to the furnace will be cut off inasmuch as the motor is caused to drive in the same direction as when a furnace temperature increase occurs. Without this thermocouple or other component open circuit protection, the opening of the thermocouple or other component would not be recognized, and the furnace would be considered falsely to be under control, giving rise to a possibly dangerous, and at any rate undesirable, condition of operation.

When the switch 162 is in the closed position, the voltage from transformer secondary winding 136 is no longer applied to the grids of tubes 103 and 104. This condition is desirable when standardizing the potentiometer.

It is noted that if alternating stray voltages of the same frequency as the alternating voltage supply source are introduced into the thermocouple and converter, or potentiometer, circuits when the latter circuits are complete, such voltages are translated by the converter 7a into alternating currents having a frequency twice that of the voltage of the supply source. Such double frequency alternating currents are ineffective to cause operation of the motor 11 inasmuch as the motor drive circuit 10 has a frequency discriminating characteristic and can distinguish between alternating currents of this double frequency and normal alternating currents.

When the thermocouple or other circuit opens, however, as upon the occurrence of thermocouple burnout, or failure of some other apparatus component, stray alternating voltages of the frequency of the supply source which may be introduced into the input to the converter 7a will not be translated into double frequency, non-motor driving signals in the amplifier 9, but on the other hand, will tend to effect motor operation. Moreover, the magnitude of the stray alternating voltages introduced into the converter or potentiometer circuit upon open circuiting of the thermocouple or other component tends to increase due to the consequent increased impedance of the thermocouple and converter circuit, further aggravating an already undesirable condition of operation.

The introduction of such stray alternating voltages into the thermocouple or potentiometer circuit is particularly undesirable when the apparatus is employed for control purposes as illustrated and described in connection with Fig. 1. Specifically, the open circuit stray voltages may in some instances be of such phase with respect to the supply voltage and of such magnitude that when amplified they will neutralize the protective voltage introduced into the motor drive stage by the transformer secondary winding 136. Consequently, upon open circuiting of the thermocouple, or other apparatus component, the stray alternating voltages tend to deprive the apparatus of its open circuit "safe" operation.

In order to eliminate such undesirable operation of the apparatus due to the introduction of stray alternating currents into the converter and potentiometer circuits, the resistance 141 mentioned hereinbefore, is connected across the winding 49 of the transformer 47. Resistance 141 limits the impedance of the winding 49 when the primary circuit is opened as upon thermocouple burn-out or failure of other apparatus component and as a result appreciably reduces the magnitude of the stray voltages which may then be picked up in the converter circuit, thus obviating the neutralization of the protective voltage introduced into the motor drive circuit by the transformer secondary winding 136. This limiting of the impedance of winding 49 by the resistance 141 when the input circuit to the converter is opened is accompanied by a limiting of the impedance of the input or grid circuit of the triode 74. This renders ineffective the stray voltages which are picked up in this input or grid circuit, which stray voltages would otherwise cause undesirable operation due to increased impedance of the input circuit occurring as a result of the converter or potentiometer circuit becoming opened. It is noted that in the aforementioned practical embodiment of the invention the impedance of the primary circuit of the transformer 47 is of the order of 150 ohms when the measuring circuit and converter 7 are connected across the transformer primary winding and the transformer secondary is connected as shown in Fig. 1. Also, the impedance of the secondary circuit of the transformer 47 is of the order of fifty thousand ohms when the transformer is connected as shown in Fig. 1, and with the resistance 141 having a value of one tenth megohm as suggested hereinbefore. Under these conditions, the secondary circuit impedance is limited to one tenth megohm upon open-circuiting of the primary circuit, whereas, this secondary circuit impedance would increase to a value of the order of three tenths megohm upon open-circuiting of the primary circuit were not the resistance 141 connected in the circuit as shown.

The novel grounding arrangement of the electronic amplifier 8 as disclosed herein serves to keep the level of stray alternating voltages tending to be internally introduced into the amplifier at a low, non-objectionable value by preventing ground currents from some portions of the amplifier from flowing in the input and the first stage of the voltage amplifier 9. The arrangement also eliminates ground loop circuits which by the electromagnetic fields which they set up tend to cause stray signals to be introduced into the amplifier circuit. This novel grounding arrangement of the amplifier circuit is illustrated schematically in Fig. 1, but the actual physical details of construction are shown in detail in Fig. 2.

In Fig. 2, the container 97 of the condenser 45 is indicated as connected to the chassis by its mounting lugs, shown as conductors, at points 44, 96 and 102. Also shown are the container 56 of the transformer 47, a socket 178 for the vibrator 7, a socket 179 for the tube 72, and a socket contact 180 on the socket 179 connecting to the cathode 81 of triode 75. The ground bus 43 is grounded at chassis connection 44 and serves to ground the contact 84, mentioned hereinbefore, and the contact 180, both of socket 179, and the contact 181 on the vibrator socket 178, which last mentioned contact connects to the vibrator frame mentioned hereinbefore.

The ground bus 143 is grounded at the chassis connection 96 and serves as a ground connection for the condenser 142 and resistances 141 and 144. By this arrangement, the ground currents from other components of the amplifier 8 do not flow in the input and first stage of amplification and are incapable, therefore, of causing any stray voltages therein, as would occur were a common ground bus used for the entire amplifier circuit.

A conductor 182 serves as a ground connection for the terminal 60 of the winding 49 of the transformer 47. This conductor is grounded at the chassis connection 96. By the use of this separate ground conductor for the secondary winding, the ground currents flowing in the other parts of the circuit are prevented from flowing through this winding, with the result that these currents cause no stray voltages to be developed in the winding. Were the secondary winding grounded by means of a common ground bus, currents flowing in the ground bus from other portions of the circuit would flow through the portion of the bus used as the secondary ground and produce a voltage across this section of the bus. This voltage would then actually be in circuit with the transformer secondary winding 49 and would be amplified as an input voltage, and thus interfere with the normal desired operation of the apparatus.

The can 56 of the transformer 47 is grounded by means of the chassis connection 55. The core 48 and the shield 54 of transformer 47 are also grounded at the chassis connection 55 by means of the conductor 183.

The container for the vibrator 7 is grounded at the chassis connection 46 by means of a spring clip, not shown, which is fastened to the chassis and contacts the vibrator when the latter is plugged into its socket 178.

The remainder of the ground connections in the circuit of the amplifier 8 are made to the ground bus 95, which is grounded at the chassis connection 96. All of the circuit components which are grounded to the bus 95 are not shown in Fig. 2 in order to avoid unnecessary complications of the drawing, but the resistances 147 and 151 are shown as examples of the grounding to bus 95.

The power transformer 125 is completely insulated from the chassis on which it is mounted, and its case 184, the core 126, and the shield 138 are grounded by the conductor 139, which connects a transformer mounting screw 185 to the ground bus 95, at the ungrounded end of said bus. By this grounding and insulating arrangement, ground loops consisting of the ground bus and the chassis or of the chassis and the transformer case are eliminated. Were such loops present, they would cause stray voltages to be induced in the circuits of the amplifier.

The undesirable stray signals which have been discussed herein may have their origin in two general places, namely in the measuring circuit and in the amplifier circuit. In Fig. 3 is shown a modified arrangement of the input circuit of the voltage amplifier 9 of Fig. 1 effecting a reduction of the stray level of the amplifier by eliminating a large portion of the stray alternating voltages leaving their origin in the amplifier circuit. In this modification, the cathode bias resistance 144, and cathode bias condenser 101 of Fig. 1 are eliminated, the cathode 78 being grounded to ground bus 143, and the triode 74 is biased by a grid leak bias resistance 186 and a grid condenser 187. The introduction of some stray alternating voltages in the amplifier circuit is due to leakage between the heater 82 and the cathode 78 of the triode 74, which leakage causes a current to flow in the cathode circuit of the triode. This current develops a voltage across the cathode bias resistance and condenser when one is used, which voltage is amplified as a stray signal. The elimination of cathode bias and the cathode bias resistance and condenser, as shown in Fig. 3, eliminates the source of this stray signal.

A modification of the amplifier circuit resulting in a reduction of the stray alternating voltages picked up in the measuring circuit external to the amplifier is shown in Fig. 4. A pair of variable inductance coils 188 and 189 are inserted in the leads 71 and 61, respectively, to the converter circuit 7a. By varying the inductance of the coils 188 and 189, different values of stray voltage will be picked up by the coils, these voltages acting to cancel out the stray voltages caused by any unbalance of the hum-bucking windings of the input transformer 47. The coils 188 and 189 may be wound on the same core, the latter being moveable relative to the two coils for permitting the above mentioned inductance adjustments to be made. If desired, the coils 188 and 189 may be wound on separate moveable cores, the inductance of the two coils then being independently adjustable by moving the cores relative to the respective coils. The coils 188 and 189 should be located near the input transformer 47 so that they will be under the influence of the same stray magnetic fields as the input transformer. This method of stray voltage cancellation results in a marked reduction of the stray level by virtue of the cancellation of stray voltages having their origin in the measuring circuit.

For accomplishing a reduction of the strays in both the measuring and amplifier circuits, the modification shown in Fig. 5 may be employed. In this modified circuit, a variable resistance 190 is placed in the input circuit of the amplifier to cause a variable voltage to be introduced into this circuit for cancelling stray voltages present. An alternating potential is placed across the resistance 190 through the resistances 191 and 192. This potential may have its source in the heater winding of the power transformer. The resistance 190 is grounded to the chassis connection 96 at a center tap 193. It can be seen, therefore, that the resistance 190 provides a means for introducing into the amplifier input circuit, by conductor 194 a voltage of such magnitude and phase as will cancel the stray voltages of the input circuit, whether these strays have originated in the measuring circuit or in the input circuit itself. This cancellation is possible since the majority of the stray voltages are at supply voltage frequency, which is the frequency of the cancelling voltage, and moreover are either of the same phase as the supply voltage or are of opposite phase since the latter usually is the most troublesome source from which the stray voltages are derived. If desired, suitable phase shifting means may be associated with the resistance 190 for cancelling out stray alternating voltages having different phase angle relationships.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. A balanceable electrical network including a transformer having a primary winding and a secondary winding one terminal of which is connected directly to ground, means for converting a low-level direct current signal of reversible polarity into an alternating signal of reversible phase in said secondary winding, a source of low-level direct current of reversible polarity connected in series with said converting means and said primary winding, electronic amplifying means having a plurality of amplifying stages to amplify said alternating electromotive force, at least the first amplifying stage having an electric discharge device including an anode. a cathode and a control electrode, a common source of unidirectional voltage to energize the output circuits of all of said amplifying stages, the negative terminal of said source being connected to ground, means to apply the alternating electromotive force produced in said secondary winding between the cathode and control electrode of said first amplifying stage, said last mentioned means being operative to reduce the magnitude of electromotive forces applied between said cathode and control electrode from extraneous sources and including a resistor connected in shunt with said secondary winding and a cathode to ground connection independent of the connection of the other amplifying stages to ground, reversible electromagnetic means, second electronic amplifying means having an input circuit connected to the output circuit of said first mentioned electronic amplifying means and having an output circuit connected to said reversible electromagnetic means for effecting selective actuation thereof, means positioned by said electromagnetic means to balance said network following an unbalance thereof as a result of variation in said direct current signal, and means to apply an alternating voltage of predetermined magnitude to the input circuit of said second electronic amplifying means to effect actuation of said electromagnetic means in one direction upon failure of the circuit including the transformer primary winding of the first mentioned electronic amplifying means.

2. A balanceable electrical network including a transformer having a primary winding and a secondary winding one terminal of which is connected directly to ground, means for converting a low-level direct current signal of reversible polarity into an alternating signal of reversible phase in said secondary winding, a source of low-level direct current of reversible polarity connected in series with said converting means and said primary winding, electronic amplifying means comprising a chassis and having a plurality of amplifying stages to amplify said alternating electromotive force, at least the first amplifying stage having an electric discharge device including an anode, a cathode and a control electrode, a common source of unidirectional voltage to energize the output circuits of all of said amplifying stages, said source comprising a rectifier, a container mounted on but insulated from said chassis and enclosing a power transformer having a core, a secondary winding connected in circuit with said rectifier and a primary winding adapted to be connected to a source of alternating voltage, a filter comprising several stages of filtering each including a condenser for smoothing out the unidirectional voltage output of said rectifier, a ground bus for advanced amplifying stages connected at one point only to said chassis and interconnecting said chassis, the negative output terminal of said rectifier and the core of said power transformer, means to apply the alternating electromotive force produced across said first mentioned secondary winding between the cathode and control electrode of said first amplifying stage, said last mentioned means including a resistor connected in shunt with said first mentioned secondary winding and a connection independent of said ground bus from said cathode to said chassis, said connection including a cathode bias resistor and a by-pass condenser connected in shunt therewith, a common container enclosing said cathode by-pass condenser and said filter condensers, said cathode by-pass condenser being electrically shielded from the condenser of the first filter stage, reversible electromagnetic means, second electronic amplifying means having an input circuit connected to the output circuit of said first mentioned electronic amplifying means and having an output circuit connected to said reversible electromagnetic means for effecting selective actuation thereof, means positioned by said electromagnetic means to balance said network following an unbalance thereof as a result of variation in said direct current signal, and means to apply an alternating voltage of predetermined magnitude to the input circuit of said second electronic amplifying means to effect actuation of said electromagnetic means in one direction upon failure of the circuit including the transformer primary winding of the first mentioned electronic amplifying means.

3. Apparatus as specified in claim 1 wherein said one terminal of said secondary winding and said cathode to ground connection are connected to ground at the same point.

JAMES C. MOUZON.

REFERENCES CITED

The following references are of record in the file of this patent:

UNITED STATES PATENTS

| Number | Name | Date |
|---|---|---|
| 1,382,914 | Hoxie | June 28, 1921 |
| 1,953,465 | Chesnut | Apr. 3, 1934 |
| 2,000,677 | Trevor | May 7, 1935 |
| 2,203,689 | Macdonald | June 11, 1940 |
| 2,376,599 | Jones | May 22, 1945 |
| 2,385,481 | Wills | Sept. 25, 1945 |
| 2,423,534 | Upton | July 8, 1947 |